May 6, 1930.  O. SIMONIS  1,757,022

LIQUID AIR OXYGEN PRODUCING PLANT

Filed April 9, 1926

Inventor
Otto Simonis
Atty.

Patented May 6, 1930

1,757,022

UNITED STATES PATENT OFFICE

OTTO SIMONIS, OF LONDON, ENGLAND

LIQUID-AIR OXYGEN-PRODUCING PLANT

Application filed April 9, 1926, Serial No. 100,972, and in Great Britain January 21, 1926.

This invention comprises improvements in and connected with liquid air oxygen-producing plant, and the object of the invention is to adapt the plant for direct operation of supply services on or to a piping system without the necessity of employing an intervening gas-compressing plant.

Heretofore, an installation for the commercial production and supply of oxygen has comprised a separate plant for the production of the oxygen by the liquid air process and a separate plant for compressing the produced oxygen into cylinders or pipes. In such installations, the rectifying column delivered the gas to a holder at approximately atmospheric pressure from which it was drawn off by a compressor. In some plants, the gas was forced by the compressor into gas bottles and in other plants the gas was forced by the compressor into reservoirs associated with a piping system adapted for supplying the various consuming places in a works or other premises.

According to this invention, the rectifying column is adapted for performing rectification under a substantial pressure, as for example, a pressure between 5 and 10 atmospheres and this column delivers directly to a holder or reservoir associated with a pipe system, there being interposed between the column and the holder a regulating means having a capacity for preserving constancy of oxygen delivery irrespective of varying pressure in the holder or reservoir. The pressures given by way of example are not limit pressures and it may be possible to employ pressures even higher than 10 atmospheres. If fluctuations of pressure in the holder or reservoir were permitted to affect the flow of oxygen from the rectifying column and the pressure of the latter, the working of the column would be adversely affected so that an installation in accordance with these improvements would be impracticable. However, by providing regulating means on the nitrogen outlet so that there is the final pressure in the column as aforesaid and interposing regulating means, such as an adjustable pressure regulating valve, between the column and the holder for maintaining a constant flow of oxygen irrespective of the pressure in the holder or reservoir, the installation becomes a practical success and presents many attractive advantages to users who have heretofore been subjected to the expense and trouble of handling and transporting heavy oxygen bottles, as the only alternative to the expensive installation of plant comprising gasholder and oxygen compressor as well as reservoirs in connection with their pipe lines.

For further ensuring the uniformity of pressure in the column and for preventing any dangerous rise of pressure therein, a safety valve is fitted thereon and adjusted for blowing off at a pressure a little greater than that predetermined for the working of the column. Also, for ensuring the said constancy and the safety of the gas reservoir, the latter is fitted with a safety valve adjusted for blowing off at a pressure a little less than that predetermined for the column to work under. The regulating valve may be of the spring-loaded diaphragm type and, if desired, a regulating valve and safety valve may be combined in one structure, as hereinafter explained.

The accompanying drawing illustrates a suitable example of improved plant.

Figure 1:
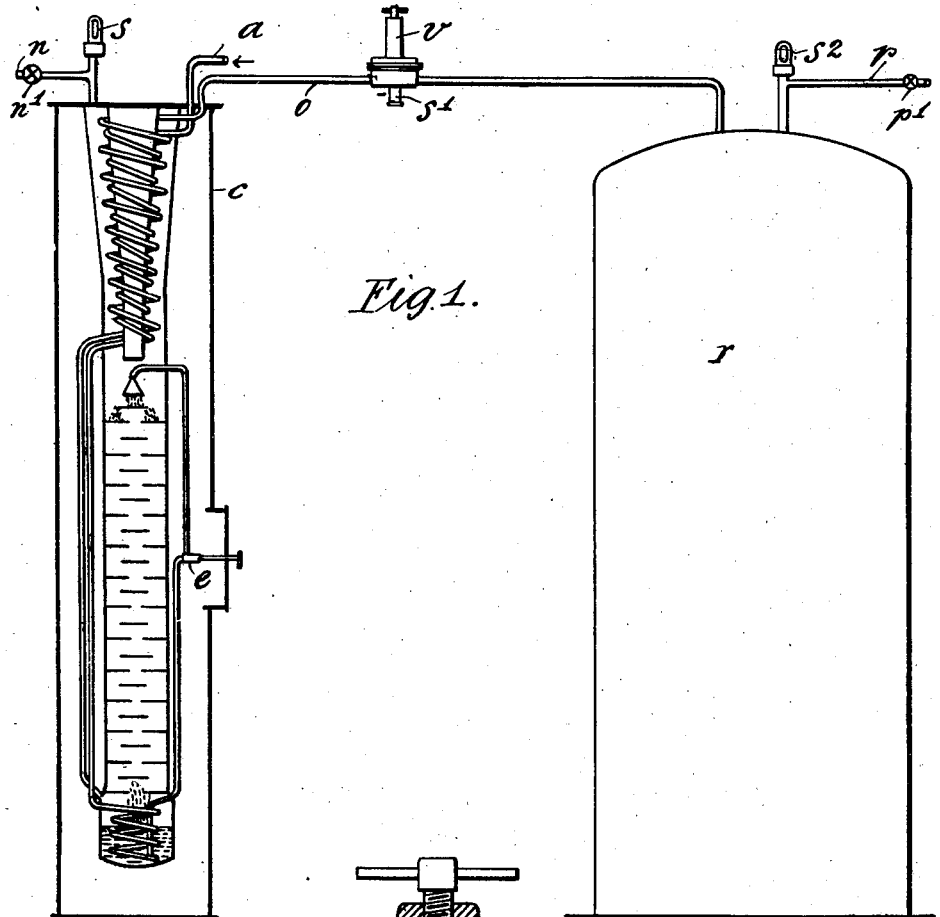
Figure 1 is a diagram of the plant in sectional elevation.
Figure 2:
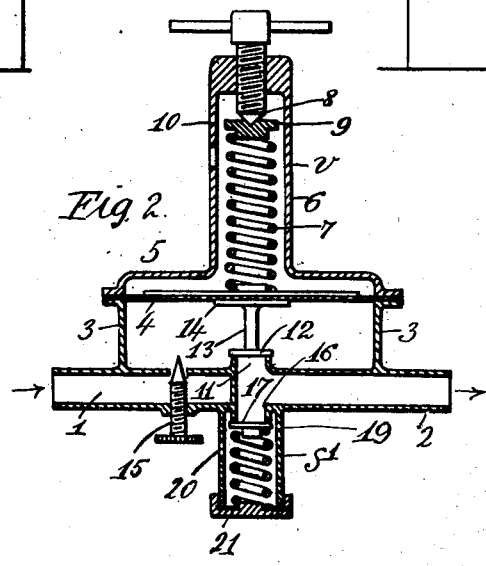
Figure 2 is a section to a larger scale of a regulator valve seen in Figure 1.

In Figure 1, $c$ is the rectification column to which air is supplied through the pipe $a$ under a predetermined pressure. The oxygen is delivered from the column through the pipe $o$ and the nitrogen through the pipe $n$ under control of the hand or other control cock $n'$. For example, the cock at $n'$ may be a pressure regulating or loaded valve of known type. A safety valve $s$ is fitted on the nitrogen outlet $n$ and is adjusted to blow off at a predetermined pressure, as for example, a pressure of 6–7 atmospheres. A regulating valve $v$ having a safety valve $s'$ combined with it, as described in detail with reference to Figure 2, is fitted on the oxygen pipe $o$ which leads from the column $c$ to a pressure storage receiver $r$. The safety valve $s'$ may be set to blow off at a pressure of 5–6 atmospheres. A connection $p$ to a pipe line system is provided on the receiver and is fitted with a stop cock $p'$ for controlling delivery to the pipe line, the pipe line connection $p$ being associated with a third safety valve $s^2$ which may be adjusted for blowing off at a pressure exceeding 5 atmospheres.

The regulator valve indicated generally in Figure 1 by the reference letter $v$ is seen in Figure 2 to comprise an inlet connector 1 and an outlet connector 2 on a diaphragm chamber 3. Across the chamber 3 there is stretched a diaphragm 4, the peripheral portion of which is clamped on the chamber 3 by the cover 5 comprising a tubular part 6. The latter encloses a spring 7 for suitably loading the diaphragm 4, the said loading being varied by adjusting a screw 8 screwing through the end of the part 6 and bearing against an abutment piece 9 fitted on the end of the spring. The tubular part 6 is formed with a port 10 for preserving atmospheric pressure in the space above the diaphragm 4. The outlet connector 2 is formed with an upwardly presented seating 11 adapted for being closed upon by a disc valve 12, the stem 13 of which carries a disc 14 for receiving the pressure of the spring 7. The passage of oxygen from the connector 1 into the chamber 3 may be throttled in varying degrees by the needle valve 15, or any other suitable valve may be employed for the purpose. As aforesaid, a safety valve, indicated generally by the reference $s'$ in Figure 1, may be combined with the regulator valve $v$. For this purpose, and as further illustrated in Figure 2, a downwardly directed seating 16 is formed on the outlet connector 2, said seating 16 being adapted to receive a valve 17 which is loaded by a spring 18 contained within a housing 19 formed on the bottom of the valve casing. The housing 19 is formed with a blow-off port 20, and a screw cap 21 thereon may be adjustable for varying the pressure at which the safety valve $s'$ is to blow off.

The operation of the plant is as follows:—

Compressed air is admitted to the column $c$ through the pipe $a$ and when once the column is in operation on oxygen production the main expansion valve $e$ is adjusted to maintain a constant level of liquid gas in the apparatus. The nitrogen outlet valve $n'$ is then adjusted, either by hand or automatically, to maintain a pre-determined pressure of say, 6½ atmospheres on the column. Since the nitrogen escaping through the pipe $n$ is many times greater than the oxygen escaping through the pipe $o$ the actual amount of oxygen drawn off through the pipe $o$ will not materially affect the pressure in the column as determined by the set of the valve $n'$.

The automatic oxygen control valve $v$ is then adjusted to maintain a pressure in the diaphragm chamber 3, which is intermediate between the working pressure of the column and the maximum working pressure of the receiver $r$ as determined by the set of the safety valves $s'$ and/or $s^2$. The action of the valve $v$ is such that the pressure in the diaphragm chamber 3 is maintained constant no matter what may be the pressure in the reservoir $r$. The pressure in the inlet connector 1 is maintained constant, being the pressure in the column as determined by the setting of the valve $n'$. The result is that between the inlet connector 1 and the diaphragm chamber 3, there is a uniform pressure drop. The valve 15 is then adjusted to give the required flow and since the pressure drop across this valve is maintained uniform the flow will remain constant.

The two conditions necessary for the efficient working of the column are that the pressure of same shall be constant and that the flow of oxygen shall also be constant. The actual flow of oxygen can be adjusted, either by the adjustment of the valve 15 or by adjustment of the pressure in the diaphragm chamber 3 by means of the regulating screw 8.

It should be pointed out that the regulating valve 15 or a calibrated port or nozzle and the pressure control in combination ensure efficient working.

Due to the higher working pressure in the column $c$ the same can be made of smaller dimensions and consequently the losses due to the influx of heat can be reduced, as compared with the dimensions and losses of a column employed in the ordinary way.

When demands are made on the reservoir $r$ by consuming devices at one or more of the various points along the pipe line, the pressure in the reservoir $r$ will necessarily be subject to fluctuation. However, pressure variations in the reservoir $r$ have no effect upon the column $c$ owing to the interposition of the regulator valve $v$.

Heretofore, rectifying columns were designed to complete the expansion at practically atmospheric pressure. The present invention is distinguished by completing the process at a substantial pressure, as for example 6 atmospheres or more, instead of at practically no pressure at all above that of the atmosphere, and this involves the differences in the mode of operation hereinbefore pointed out.

I claim:—

1. In air liquefaction apparatus including a rectification column and delivering rectified gases under pressure above atmospheric pressure, the combination with said column of a gas outlet thereon comprising valve means for pre-determining the pressure of the gas above atmospheric pressure delivered from said column, a second gas outlet thereon, said second gas outlet comprising an automatic regulator valve for ensuring a pre-determined delivery, a pressure reservoir charged from said outlet under control of said regulator valve, and safety valve means for limiting the pressure of the charge in said reservoir, substantially as set forth.

2. Air liquefaction apparatus including a rectification column for rectification under a pressure of several atmospheres, outlets, and valves on its outlets, said valves being operative for pre-determining the pressure in the column, and a fluid pressure reservoir connected with the oxygen outlet of said apparatus, the valve on the oxygen outlet combining in one structure a regulator for oxygen delivery to said reservoir and a safety valve for limiting the oxygen storage pressure, substantially as and for the purpose set forth.

3. In air liquefaction apparatus including a rectification column, in which baffle devices promote true rectification and an expansion valve delivers expanding gases into said column, the combination of nitrogen outlet valve devices for predetermining the pressure of nitrogen in such outlet, an oxygen outlet, a pressure reservoir connected to said outlet and a regulator valve located between said outlet and reservoir maintaining a substantially constant oxygen outflow.

4. Gas liquefaction and separation apparatus including a rectification column said apparatus delivering rectified gases under substantial pressure, and comprising a compressed gas supply connection, a heat exchanger, an evaporating coil, an expansion valve in the column, regulator means for said valve, controlled outlet means for a gas of superior volatility, said means ensuring the maintenance of a predetermined pressure above atmospheric pressure in the column, controllable delivery means for the gas of inferior volatility and an automatic gas regulator located between said column and receiver for the delivery from the column to said receiver, substantially as set forth.

5. In air liquefaction apparatus including a rectification column and delivering rectified gases under pressure, the combination with said column of a gas outlet thereon comprising valve means for pre-determining the pressure of the gas delivered from said column, a second gas outlet thereon, said second gas outlet comprising an automatic regulator valve for ensuring a predetermined gas delivery, a pressure reservoir charged from said column under control of said regulator valve, and safety valve means for limiting the pressure of the charge in said reservoir, substantially as set forth.

6. Air liquefaction apparatus including a rectification column for rectification under a pressure of several atmospheres, outlets, and valves on said outlets, said valves being operative for pre-determining the pressure in the column, and a fluid pressure reservoir connected with the oxygen outlet of said apparatus, the valve between the oxygen outlet and reservoir combining in one structure a regulator for oxygen delivery and a safety valve for limiting the oxygen storage pressure, substantially as and for the purpose set forth.

7. Air liquefaction apparatus including a rectification column, controllable valve means ensuring the completion of the rectification at a substantial pressure above atmospheric pressure, an automatic valve regulating the delivery of oxygen and a pressure receiver for said oxygen passing through the automatic valve, substantially as set forth.

8. Air liquefaction apparatus including a rectification column under pressure above atmospheric pressure, a pressure reservoir connected to the oxygen outlet of the column and an automatic valve controlling the pressure in the column with respect to the back pressure being built up in the reservoir to maintain a substantially constant output of oxygen under pressure.

9. The art of obtaining oxygen, which comprises rectifying liquid air under pressure above atmospheric pressure while maintaining a substantially constant discharge of oxygen.

10. The art of obtaining oxygen, which comprises rectifying liquid air under pressure above atmospheric pressure while maintaining a substantially constant discharge of oxygen against a variable back pressure.

11. The art of obtaining oxygen, which comprises rectifying liquid air under pressure of several atmospheres above atmospheric pressure while maintaining a substantially constant discharge of oxygen.

OTTO SIMONIS.